United States Patent

Beaver, Jr.

[11] 4,030,478
[45] June 21, 1977

[54] SOLAR ENERGY COLLECTORS

[76] Inventor: Emil Routzong Beaver, Jr., 4148 S. Crane Road, Tipp City, Ohio 45371

[22] Filed: Apr. 15, 1976

[21] Appl. No.: 677,493

[52] U.S. Cl. .............................. 126/271; 126/270
[51] Int. Cl.² .......................................... F24J 3/02
[58] Field of Search ............ 126/270, 271; 237/1 A

[56] References Cited

UNITED STATES PATENTS

| | | | |
|---|---|---|---|
| 3,076,450 | 2/1963 | Gough et al. | 126/271 |
| 3,399,664 | 9/1968 | Suhay | 126/271 |
| 3,943,911 | 3/1976 | Yu | 126/271 |
| 3,965,887 | 6/1976 | Gramer et al. | 126/271 |

*Primary Examiner*—Kenneth W. Sprague

[57] ABSTRACT

An apparatus comprised of a novel and efficacious arrangement of state-of-the-art materials resulting in substantial advantages in both efficacy and, especially, economy over presently known solar collectors. The invention is characterized by a closed, circuitous, solar energy absorbing pathway of especially designed profile in which water or other suitable fluid media is caused to circulate while absorbing solar thermal energy.

4 Claims, 4 Drawing Figures

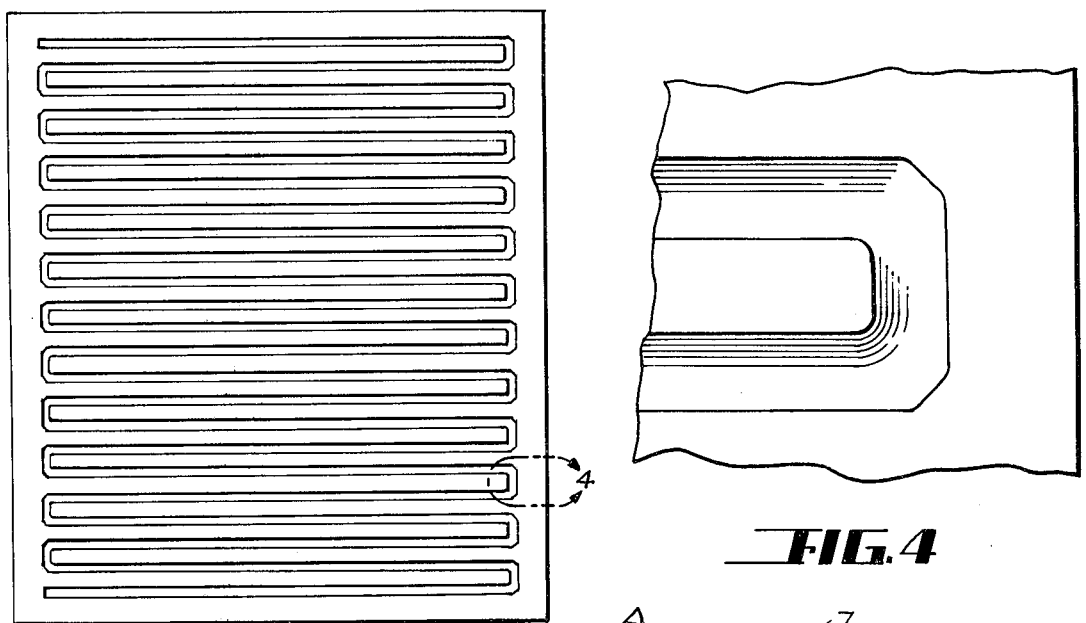
FIG. 1
FIG. 4
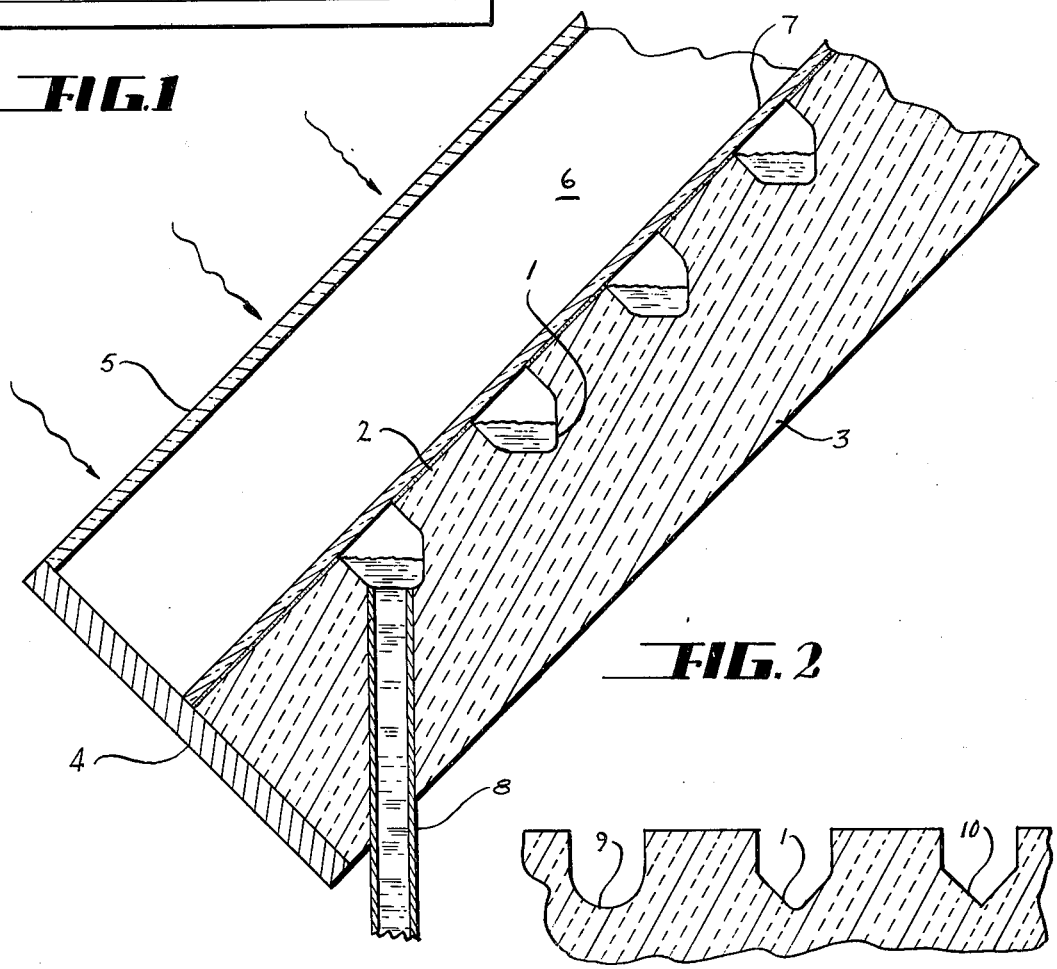
FIG. 2
FIG. 3

SOLAR ENERGY COLLECTORS

SUMMARY OF THE INVENTION

A circuitous, profiled trough is formed in an insulating solid material of substantial thickness, the trough and surface caused to become coated with a highly emissive, absorbing, non-reflecting and impervious material, and the trough closed by covering the open side with a film or sheet of material transmitting in the visible and infra-red spectra. The panel assembly containing the trough is typically placed in an inclined plane, the liquid transfer media injected at the top, said media allowed to circuitously transit the panel by gravity and being returned to the system proper from the panel bottom in a state of increased temperature and thermal content due to the absorption of thermal energy from the solar energy collector panel.

BRIEF DESCRIPTION OF THE DRAWINGS:

FIG. 1 is a view from the front of a collector panel showing a preferred circuit for use of the groove profile, the normally contiguous profiles being placed relatively apart here for greater clarity;

FIG. 2 is a side elevation of FIG. 1 in section showing profiles of the most preferred shape in functional containment of the liquid media;

FIG. 3 is stylistic in section of the modified curved concentrator profiles of interest from one modification extreme 9 through the most preferred profile 1 to the other modification extreme 10, thus functionally limiting the scope of the invention; and FIG. 4 is a part of FIG. 1 indicated and enlarged to show transfer of media by the vertical profile connecting two horizontal profile grooves which are as contiguous as permitted by the material of construction in practice.

DESCRIPTION OF THE INVENTION

A typical example of the circuitous grooved pathway design is shown in FIG. 1 and enlarged in FIG. 4 of the drawings. FIG. 2 shows a cross-section of the bottom of the same panel in an inclined mode, with the liquid transfer media in the profiled grooves 1 and the liquid media withdrawal tube 8 shown in place in the bottom groove. A similar injection tube, not shown, is placed in the top groove of the assembly. The primary purpose of the straight sides and oval bottom of the grooved pathway profile design is based on the observation that an efficient solar energy absorbing material over the visible spectrum of 0.38 to 0.78 micrometers and the infrared spectrum of greater than 0.78 micrometers wavelength is not only low in reflectivity, but also high in emissivity. The resulting emission or reradiation of collected energy is further complicated by the tendency for the approximately equal visible and infra-red components originally collected to be emitted in the form of predominately longer wavelength infra-red radiation from a good collector surface. The profile 1 shown in FIGS. 2 and 3, having sides straight or tapered slightly inward at the top and with an oval bottom, possesses the easily demonstrated inherent efficiency of reradiating energy in incidental paths intersecting other surfaces of the groove structure in the manner of a curved concentrator, rather than being reradiated back into space. FIG. 3 shows the preferred pathway profile 1 and the relative range extremes 9, having a round bottom, and, 10, having an angled and flat-surfaced bottom. Profile 1 is the compromise between 9 and 10 with particular design factors taken into account, but is not specifically limiting, since other specific profiles within the range will be optimum for other specific total apparatus designs. Since the basis for the panel is composed of a thermally insulating material such as foam or suitable fiberous substance, said reradiation is also of necessary function to transfer the collected energy to the areas in contact with the liquid transfer media — no thermally conductive material such as metal necessarily being present in the design to otherwise accomplish same. An additional and fortuitous function of the groove profile 1, as shown in FIG. 2, is the enhanced containment of the liquid transfer media in contact with a large portion of the groove surface.

The film or sheet solar energy transmitting material 7, shown in contiguous contact with the collector panel surface 2 in FIG. 2, is also of multiple purposes. Firstly, said film or sheet serves to physically close the circuitous pathway groove 1 and prevent loss of the liquid transfer media to overflow or evaporation. It, secondly, presents a relatively transverse surface to incident solar rediation for its initial transmittance, while reradiation from emission by the collector groove profile is predominately of obtuse angle of incidence tending to have a reflective and refractive function of directing a portion of said emissive reradiation back into the collector groove profile, thereby further reducing losses of collected energy. It, thirdly, is spatially placed in such proximity to the collector surfaces 1 and 2 as to minimize the condensation of any evaporated liquid media and its resulting blocking effect on the transmittance of solar energy, both by virtue of operating at inherently higher temperatures and by being isolated from cooling effects of the environment external to the panel assembly by the second thermally insulating, by dead-air-space 6, and protecting film or sheet 5 shown in FIG. 2.

The solid thermally insulating base 3 for the collector panel is comprised of materials typified by a foam substance or fiberous board. For do-it-yourself fabrication, an example uses three ½ inch thick by 4 foot by 8 foot builder's boards procured locally and laminated together. The groove profile is then cut in on one inch centers with a ½ inch diameter oval rotary file, powered by a router, to a depth of greater than 7/16 inch but less than one-half inch, resulting in a circuitous pathway in either the 4 foot or 8 foot horizontal dimension, as desired for the particular installation, and of approximately the correct profile. A coating impervious to the liquid transfer media and having good solar energy absorbing characteristics is applied to the grooved surface in multiple coats to contain said liquid media and absorb and transfer the solar energy. A coating consisting of, but not limited to, equal parts of urethane varnish and −325 mesh colloidal graphite diluted to a handling consistency for brush or spray, or its commercially available equivalent, is considered an example for service in a water system. Two sheets of 4 foot by 8 foot plastic window glazing for 5 and 7 and the entire assembly contained in a structural frame 4 typically completes the collector panel apparatus. The top film or sheet 5 is omitted in interior placements such as greenhouses or specially constructed roof designs using transmitting construction material. A typical commercially produced unit uses solid 1½ inch thick foam or fiberous board 3 with the groove 1 and coating surface 1 and 2 formed integrally in material production and a 1½ inch dead-air-space 6 or solar energy transmitting foam slab suitably contained in a structural frame 4. A relatively long and narrow panel placed between roof rafters is another design having technical, economic and architectural merit.

Economical advantages for the subject apparatus result from the extremely simple construction in very low-cost materials which are amenable to do-it-yourself fabrication and installation by home craftsmen or contractors of average capability, as well as for very low-cost commercial production. The illustrated layered panel construction is contained in an insulated structural frame, the entire assembly suitably located in aspect to the sun, and connected to a state-of-the-art heat storage and utilization system. The light weight of the assembly eliminates much of the necessity for supporting structure and permits installation on or under a suitable roof, inside a window of large glazed area, as a carport type structure, on the side of a hill, or as a separate solar heating building structure.

Technological advantages for the subject apparatus include low conductive operational heat losses to the environment due to the good thermal insulating properties of the construction, low radiative energy emission losses due to the grooved pathway design profile and contiguous film or sheet of transmitting material, long cycle exposure time of the liquid transfer media to the solar energy due to the long circuitous pathway and resulting in increased input-output temperature differential of the media, and a low degree of sensitivity of the groove profile design to either the plane of inclination of the panel or the incidental angle of the solar radiative path.

The cumulative result is presentation of a useful, effective and economical apparatus assembly and a novel invention believed to differ substantially from existing solar energy collectors.

I claim:

1. In a solar heat exchanger, the combination comprising:
   a. base member of insulating material having an upper surface for frontwardly facing the sun,
   b. a circuitous grooved pathway formed in said upper surface of the base member,
   c. said grooved pathway having side walls disposed substantially normal to said upper surface and sloping bottom wall portions joined to the lower parts of the side walls, said bottom wall portions intersecting at substantially the central portion of the grooved pathway, whereby the rays impinging on said walls and wall portions are generally redirected into said pathway,
   d. a solar energy transmitting sheet in contiguous contact with said upper surface of the base member and overlying said grooved pathway to form a closed circuitous conduit,
   e. said base member having frame means extending outwardly therefrom,
   f. a transparent sheet and means to secure said transparent sheet to said frame in spaced relation to said solar energy transmitting sheet to form a dead air space therebetween, and
   g. means to introduce a heat absorbing fluid into said closed circuitous conduit.

2. The heat exchanger of claim 1 wherein said upper surface is tilted to extend downwardly at an angle relative to the vertical and said means to introduce fluid is located at the top of said heat exchanger whereby the fluid flows by gravity through said conduit.

3. The heat exchanger of claim 1 wherein the grooved pathway has an emissive coating.

4. The heat exchanger of claim 1 wherein the grooved pathway has a coating comprised of approximately equal parts of −325 mesh size classification colloidal graphite and resinous polymeric plastic.

* * * * *